(12) United States Patent
Asada et al.

(10) Patent No.: US 7,257,314 B2
(45) Date of Patent: Aug. 14, 2007

(54) COPY CONTROL METHOD AND APPARATUS FOR A RECEIVING SYSTEM

(75) Inventors: Tomoji Asada, Tokyo (JP); Satoshi Iino, Kanagawa (JP); Sunao Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 1108 days.

(21) Appl. No.: 09/778,711

(22) Filed: Feb. 7, 2001

(65) Prior Publication Data

US 2001/0014974 A1  Aug. 16, 2001

(30) Foreign Application Priority Data

Feb. 9, 2000  (JP) ............................ P2000-038058

(51) Int. Cl.
*H04N 5/91* (2006.01)
(52) U.S. Cl. ....................... 386/94; 380/201; 380/203
(58) Field of Classification Search ................... 386/1, 386/83, 94; 360/60; 380/201, 203; 705/57, 705/58; 713/182, 189, 193; H04N 5/76, H04N 5/781, 5/91

See application file for complete search history.

(56) References Cited

U.S. PATENT DOCUMENTS 5,799,081 A * 8/1998 Kim et al. ................. 380/203
6,209,131 B1 * 3/2001 Kim et al. ................... 725/50
6,559,898 B1 * 5/2003 Citta et al. .................. 348/723
6,601,074 B1 * 7/2003 Liebenow ................ 707/104.1
6,694,022 B1 * 2/2004 Matsushita .................. 380/201
6,700,989 B1 * 3/2004 Itoh et al. ................... 382/100
2001/0033739 A1 * 10/2001 Oguro et al. ................. 386/94

* cited by examiner

*Primary Examiner*—Vincent F. Boccio
(74) *Attorney, Agent, or Firm*—Frommer Lawrence & Haug LLP; William S. Frommer; Thomas F. Presson

(57) ABSTRACT

The present invention enhances user friendliness of a system which is controlled by use of on-screen display by disabling the operation of these devices if it not permitted. According to the invention, when a recording of a received program is attempted, the program is checked for copy protection. If the program is found copy protected, a warning thereof is displayed and control of a recording/reproducing device concerned is disabled. This warning display allows the user to determine whether or not a program being received is copy protected beforehand, thereby preventing the video signal containing a copy protection control signal from being recorded on the recording/reproducing device. In addition, according to the invention, when a record button is pressed, it becomes a record stop button, being put in the selected state. This further enhances the user friendliness.

18 Claims, 6 Drawing Sheets

YOU CANNOT RECORD
THIS PROGRAM

FIG. 6

COPY CONTROL METHOD AND APPARATUS FOR A RECEIVING SYSTEM

BACKGROUND OF THE INVENTION

The present invention relates generally to a receiving system, a receiving apparatus, and a receiving system control method for receiving digital satellite broadcast.

A system composed of a satellite tuner, a video recording/reproducing unit, and a television receiver allows a user to perform various operations while looking at a display screen. For example, the display screen shows information about a currently received channel and its genre, various setting states of the satellite broadcast tuner, and information about devices connected to this system. Looking at these items of information shown in the display screen, the user can check and change the current setting states.

Attaching an infrared ray generating device called an AV mouse to the satellite broadcast tuner allows the user to integrally operate the system components on-screen. This allows the user to make reserved video recording for example on-screen.

To be more specific, to make settings for reserved video recording, setting information and operation buttons, and so on are displayed on the display screen of the television receiver. In satellite broadcasting, program information is sent by EPG (Electronics Program Guide). Therefore, for making reserved video recording, an EPG screen is displayed. Looking at this screen, the user inputs the settings necessary for reserved video recording by use of a remote controller.

When the user has thus inputted the settings for reserved video recording, the satellite broadcast tuner starts receiving a specified program at the preset video recording start time. At the same time, the AV mouse outputs an infrared command signal to the video recording/reproducing unit to set the same to the video recording state. Upon receiving this infrared command signal, the video recording/reproducing unit is set to the video recording state. Then, the satellite broadcast tuner sends the video and audio signals of the reserved program to the video recording/reproducing unit, on which these signals are recorded.

Sometimes, recording of a program currently being viewed is wanted on the spot. To satisfy this need, it is desirable for the above-mentioned system in which the AV mouse is used for an integrated operation of the system components, namely the television receiver, the satellite broadcast tuner, and the video recording/reproducing unit, to display a record button for recording a currently viewed program and, when this button is pressed, record the program by user's operating the remote controller of the satellite broadcast tuner while looking at the screen display.

However, some of the programs transmitted through digital satellite broadcasting are copy-protected and therefore cannot be recorded. The copy-protected programs have a copy-protect signal (for example, Macrovision (trademark)) included in their video signals to prevent copy-protected programs from being replicated by the video recording/reproducing unit. Therefore, if the system is controlled so that the video recording/reproducing unit is set to the recording state upon pressing of the record button, the video signal having the copy-protect signal is taped by the video recording/reproducing unit. The user knows that such a tape cannot be reproduced only after attempting the reproduction of the tape, thereby making the above-mentioned related-art system inconvenient for use.

SUMMARY OF THE INVENTION

It is therefore an object of the present invention to provide a receiving system, a receiving apparatus, and a receiving system control method which are enhanced in user-friendliness by disabling, when controlling one device by another constituting a system by use of an on-screen display, the controlling device if the operation of the controlled device is not permitted.

In carrying out the invention and according to one aspect thereof, there is provided a receiving system composed of a receiving device, a monitor device for displaying an output of the receiving unit, and an external recording device to be controlled by the receiving device, the receiving device comprising: an on-screen display controller for displaying a screen for various setting states and setting items onto the monitor device in an on-screen manner; an external device controller for setting an operation of an external recording device; and a controller for determining, when a recording input is supplied, whether a received program is copy-protected or not, and, if the received program is found not copy-protected, setting the external recording device to a recording state and, if the received program is found copy-protected, disabling control of the external recording device.

When an attempt is made to video-tape a received program, it is determined whether the received program is copy-protected or not. If the received program is found copy-protected, a warning screen is displayed and, at the same time, the external device is disabled. The warning display allows the user to know that a currently viewed program is copy-protected and prevent a recording of the video signal including a copy-protection signal from being recorded on a video recording/reproducing unit. In addition, according to the present invention, when a video record button is pressed, this record button becomes a record stop button to be put in selected state, thereby further enhancing the user friendliness.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings. Now, referring to FIG. 1, there is shown a satellite broadcasting system to which the present invention is applicable. In the figure, reference numeral 1 denotes a satellite broadcast tuner. Reference numeral 2 denotes a television receiver. Reference numeral 3 denotes a video recording/reproducing device.

Figure 1:
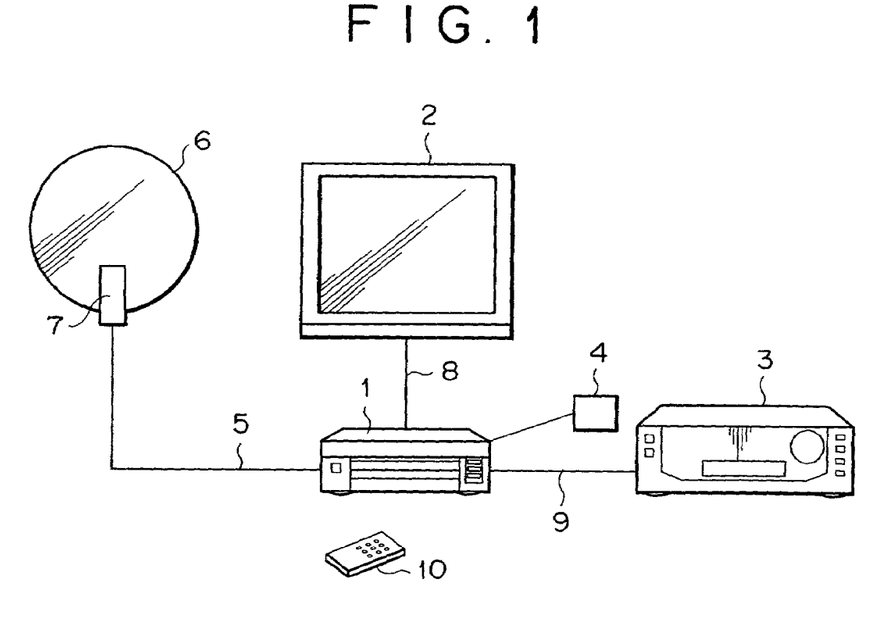
FIG. 1 is a schematic diagram illustrating a receiving system practiced as one preferred embodiment of the invention.

The satellite broadcast tuner 1 decodes a signal received from a CS (Communications Satellite) digital broadcast to form a video signal and an audio signal based on the NTSC (National Television System Committee) standard for example. The satellite broadcast tuner 1 has an AV mouse 4. The AV mouse 4 generates an infrared command signal which controls other components, the video recording/reproducing device 3 in this example, through the satellite broadcast tuner 1.

An antenna terminal of the satellite broadcast tuner 1 is connected, through a cable 5, to a low-noise converter 7 attached to a parabola antenna 6. The satellite broadcast tuner 1 and the television receiver 2 are interconnected through a cable 8. Further, the satellite broadcast tuner 1 and the video recording/reproducing device 3 are interconnected through a cable 9.

Radio waves from a communications satellite concerned are transmitted on 12 GHz band for example. These radio waves are received by the parabola antenna 6 to be converted by the low-noise converter 7 into a 1 GHz band signal for example. The output of the low-noise converter 7 is supplied to the antenna terminal of the satellite broadcast tuner 1 through the cable 5.

A desired carrier signal is selected from the received signals by the satellite broadcast tuner 1 and an MPEG2 (Moving Picture Coding Expert Group 2) transport stream is demodulated. From the demodulated transport stream, video and audio packets of a desired program are extracted. The extracted video and audio packets are decoded into NTSC video and audio signals for example.

The video and audio signals received from the satellite broadcast tuner 1 are supplied to the television receiver 2 through the cable 8. Then, the screen of the desired program is displayed and the voice is outputted on the television receiver 2.

In video recording a satellite broadcast program, the video recording/reproducing device 3 is set to a video recording state and the video and audio signals from the satellite broadcast tuner 1 are supplied to the video recording/reproducing device 3 through the cable 9. The video and the audio signals are then recorded on a recording medium such as a video tape by the video recording/reproducing device 3. When the video recording/reproducing device 3 is set to a reproducing state, the video and audio signal are reproduced from the recording medium loaded in the video recording/reproducing device 3, the reproduced video and audio signals are sent to the satellite broadcast tuner 1 through the cable 9, from which these signals are supplied to the television receiver 2 through the cable 8 to be displayed and sounded on the television receiver 2.

The satellite broadcast tuner 1 can be operated by a remote controller 10. Various setting operations can be made on the screen of the television receiver 2. Attaching the AV mouse 4 to the satellite broadcast tuner 1 allows the user to set the operations of the video recording/reproducing device 3 by operating the remote controller 10.

Figure 2:
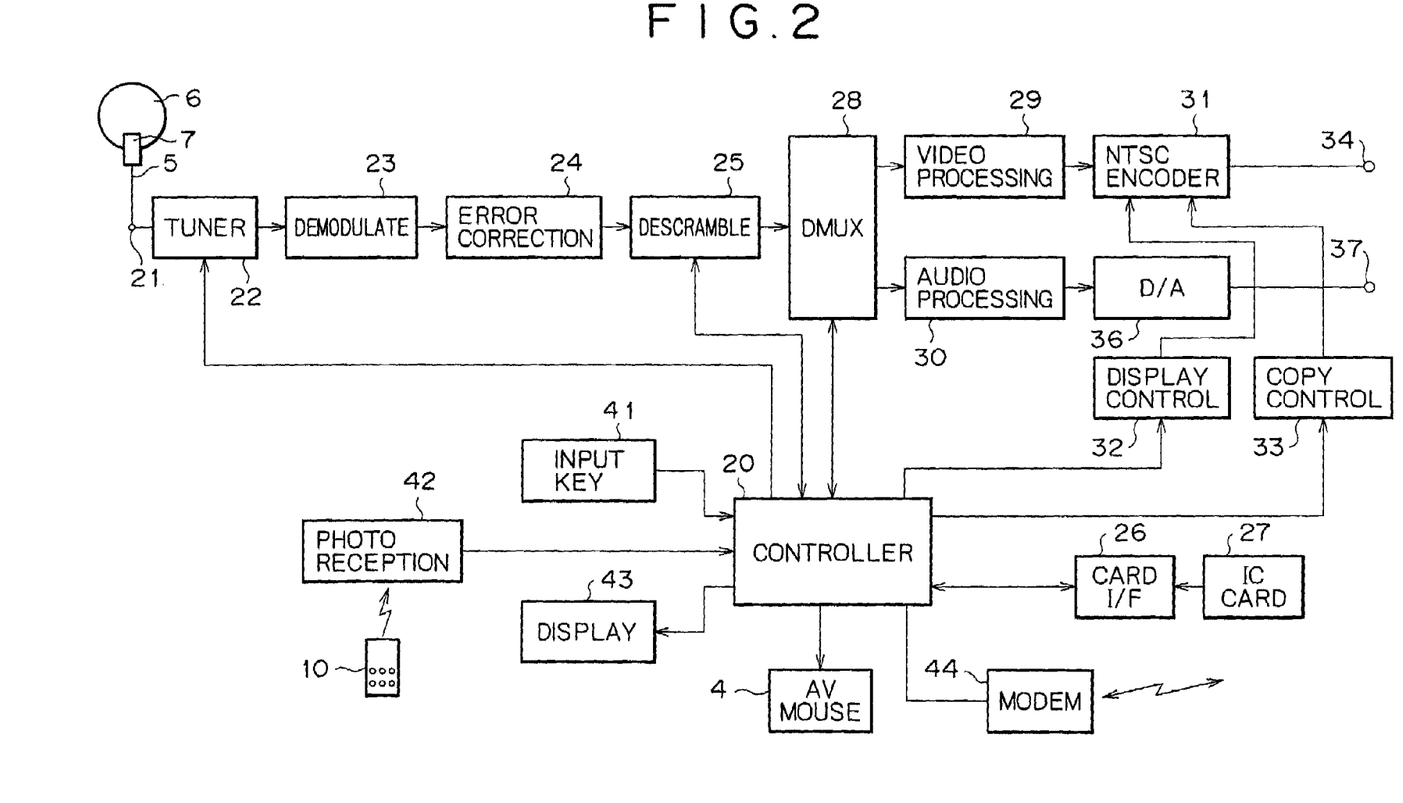
FIG. 2 is a block diagram illustrating one example of a satellite broadcast tuner practiced as one preferred embodiment of the invention.

Referring to FIG. 2, there is shown a configuration of the satellite broadcast tuner 1. In the figure, a radio wave transmitted on a 12 GHz band for example via a communications satellite is received by the parabola antenna 6 to be converted by the low-noise converter 7 attached to the parabola antenna 6 into a 1 GHz band signal. The output of the low-noise converter 7 is supplied to an antenna terminal 21 of the satellite broadcast tuner 1 through the cable 5.

The signal from the antenna terminal 21 is supplied to a tuner circuit 22. From the received signal, a signal of a predetermined carrier frequency is selected by the tuner circuit 22 to be converted into an intermediate signal. To the tuner circuit 22, a control signal for frequency setting is supplied from a controller 20. On the basis of this control signal, the received frequency is set.

The output of the tuner circuit 22 is supplied to a demodulator 23. QPSK (Quadrature Phase Shift Keying) demodulation is executed by the demodulator 23. The output of the demodulator 23 is supplied to error correction circuit 24. Error correction is executed by the error correction circuit 24.

The output of the error correction circuit 24 is supplied to descrambler 25. The received ECM (Entitlement Control Message) data and EMM (Entitlement Management Message) data are supplied to the descrambler 25. At the same time, descramble key data are supplied to the descrambler 25 from an IC card 27 loaded in an IC card slot 26. Also, the descrambler 25 determines whether the received program is recordable or not on the basis of the ECM and EMM data.

Using the received ECM data and EMM data and the key data stored in the IC card 27, the descrambler 25 descrambles the MPEG transport stream. Also, the descrambler can determine whether the MPEG2 transport stream is copy-protected or not on the basis of the received ECM data and EMM data. The descrambled MPEG2 transport stream is sent to a demultiplexer 28.

On the basis of the command from the controller 20, the demultiplexer 28 separates a desired packet from the transport stream supplied from the descrambler 25. A packet identifier (PID) is written to the header of the transmission packet. On the basis of this PID, the video and audio packets of the desired program are extracted by the demultiplexer 28. The video packet of this desired program is sent to a video processor 29 while the audio packet is sent to an audio processor 30. PSI (Program Specific Information) is sent to the controller 20.

The video processor 29 performs MPEG2 decoding on the video signal received from the demultiplexer 28 to form video data. The resultant video data are supplied to an NTSC encoder 31. The video data decoded by the video processor 29 are converted by the NTSC encoder 31 into an NTSC video signal.

For the NTSC encoder 31, a display controller 32 and a copy protection controller 33 are provided. The display controller 32 forms various on-screen displays on the basis of the control signal supplied from the controller 20. The copy protection controller 33 generates a copy protection control signal such as Macrovision for copy-protected program on the basis of the EMM/ECM information of PSI in order to protect copyright. The output of the NTSC encoder 31 is supplied to a video output terminal 34. From the video output terminal 34, an NTSC composite video signal is outputted.

The audio processor 30 receives the audio packet from the demultiplexer 28 and executes MPEG audio decoding on the received audio packet to form audio data before data compression. The output of the audio processor 30 is converted by a D/A converter 36 into an analog audio signal, which is then outputted from an audio terminal 37.

The satellite broadcast tuner 1 is operated from an input key 41 and the remote controller 10. An infrared command signal issued by the remote controller 10 is received by a photo receiver 42 to be sent to the controller 20. As described, the controller 20 is attached with the AV mouse 4. Operating the AV mouse 4 issues infrared command signals to other devices. Thus, the remote controller 10 of the satellite broadcast tuner 1 controls other devices.

The setting state of the satellite broadcast tuner 1 is displayed on a display block 43 on the basis of the setting information supplied from the controller 20 and, at the same time can be displayed on a television screen on an on-screen manner. A modem 44 is provided through which account information is sent via a telephone line.

Figure 3:
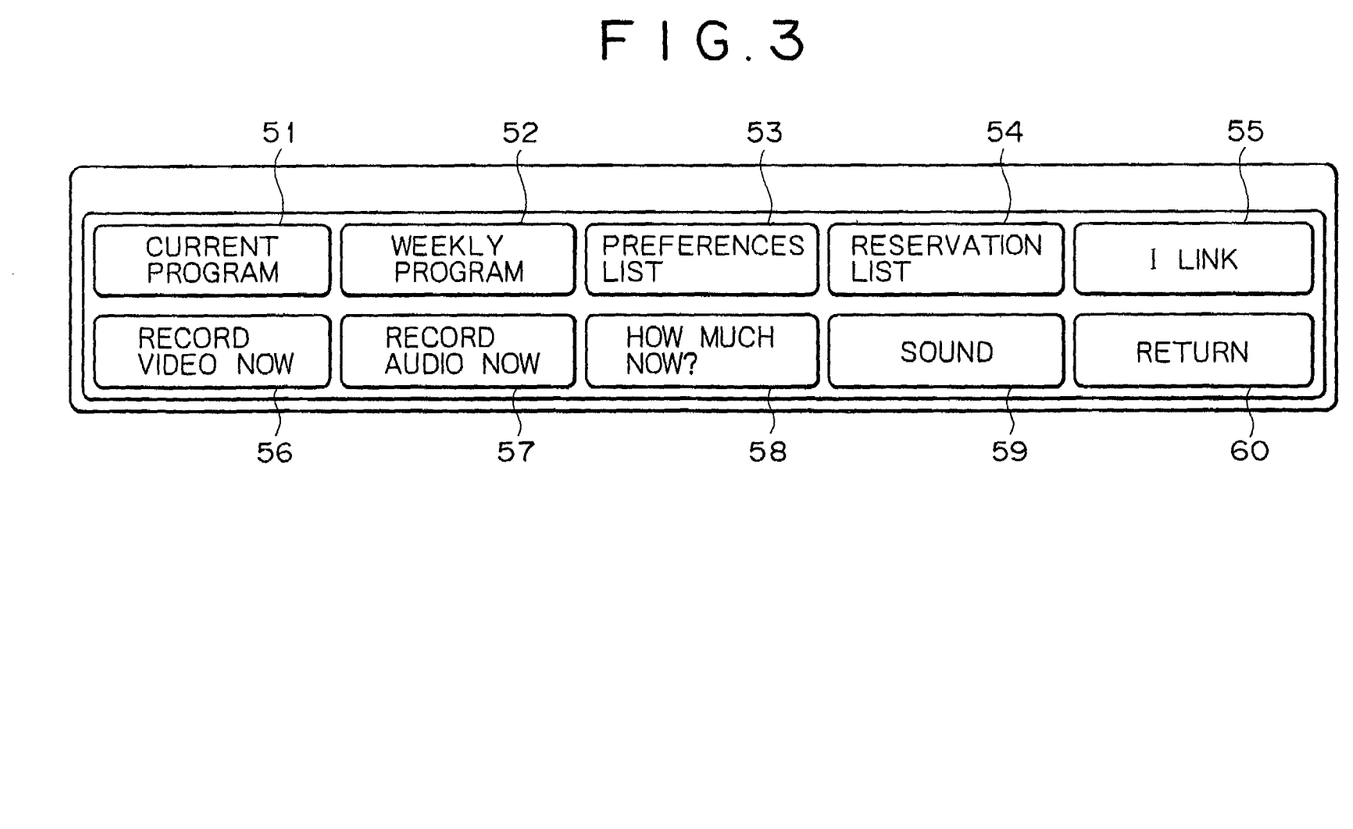
FIG. 3 is a diagram illustrating a display on the satellite broadcast tuner shown in FIG. 2.

Referring to FIG. 3, there is shown an on-screen display for executing various setting operations. This screen is called an EZ panel. On the EZ panel, buttons 51 through 60 are arranged as shown in FIG. 3, which are displayed as superimposed on the screen of the television receiver 2. These buttons 51 through 60 are set by operating the remote controller 10.

To be more specific, the remote controller 10 has a jog stick for moving the cursor vertically and horizontally, direction keys, and an enter button. Operating the joy stick and direction keys can select the buttons 51 through 60 one after another. The selected buttons are highlighted in a predetermined manner. When the desired buttons have been thus selected and the enter button is pressed, the selected buttons are set.

Referring to FIG. 3 again, when the current program button 51 is pressed, the EPG associated with a currently received program is displayed. When the weekly program button 52 is pressed, the EPG indicative of a weekly program schedule is displayed. When the preferences button 53 is pressed, a list of user-specified preferences programs is displayed. When the reservation button 54 is pressed, a list of user-specified reserved programs is displayed. When the iLINK button 55 is pressed, a list of devices connected to the interface is displayed. When the record video now button 56 is pressed, the video recording/reproducing device is set to the recording state, upon which recording starts. The record audio now button 57 is pressed, the audio recording/reproducing device is set to the recording state, upon which recording starts. When the how much now button 58 is pressed, account information is displayed. When the sound button 59 is pressed, a screen for setting PCM voice service is displayed. When the return button 60 is pressed, the previous screen is displayed again.

Thus, in the present example, the record video now button 56 and the record audio now button 57 are provided. When the record video now button 56 is pressed, the video recording/reproducing device 3 is set to the video recording state, upon which video recording starts. The system also can have an audio recording/reproducing device such as an MD recording/reproducing device. When the record audio now button 57 is pressed, this audio recording/reproducing device is set to the recording state, upon which audio recording starts.

To be more specific, when the record video now button 56 is pressed, an infrared command signal for setting the video recording/reproducing device 3 to the recording state is outputted from the AV mouse 4 to the video recording/reproducing device 3. This infrared command signal sets the video recording/reproducing device 3 to the video recording mode.

From the satellite tuner 1, the video and audio signals of a program current received are outputted to the video recording/reproducing device 3 through the cable 9. The video and audio signals of the currently received program are recorded on a recording medium such as a magnetic tape by the video recording/reproducing device 3.

Figure 4:
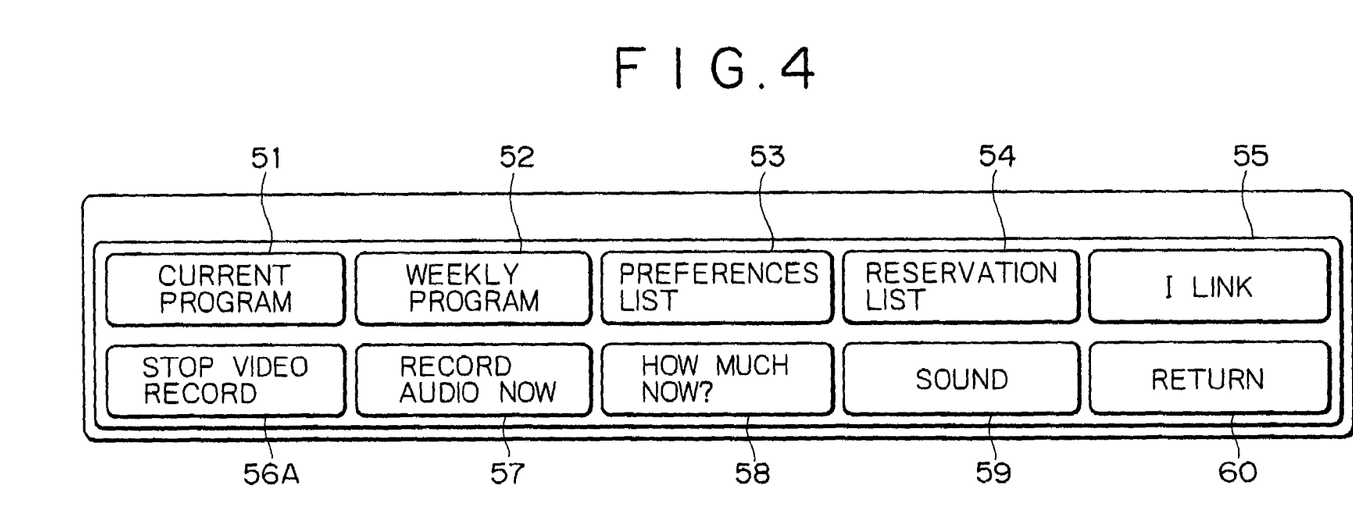
FIG. 4 is a diagram illustrating another display on the satellite broadcast tuner shown in FIG. 2.

When the record video now button 56 or the record audio now button 57 is pressed, the pressed button becomes a stop video record button or a stop audio record button, being put in the selected state. For example, when the record video now button 56 is pressed, this button becomes a stop video record button 56A as shown in FIG. 4, being put in the selected state. When the stop video record button 56A is pressed, an infrared command signal is issued from the AV mouse 4 to the video recording/reproducing device 3 to put the same into the stopped state. This command signal stops the recording of a program on the video recording/reproducing device 3. Thus, when the record video now button 56 or the record audio now button 57 is pressed, the pressed button becomes a stop video record button or a stop audio record button, being put in the selected state, thereby enhancing user friendliness.

Some satellite broadcast programs are disabled for video recording for copyright protection. For those copy protected programs, a video signal which includes a copy protection signal is outputted. Any video signals including a copy protection signal that are recorded by the video recording/reproducing device 3 cannot be normally reproduced.

If, simply by pressing the record video now button 56 for a copy protected program, an infrared command signal is outputted from the AV mouse 4 to the video recording/reproducing device 3 for setting the same to the recording state, the video signal containing a copy protection signal is recorded. If this happens, the user knows that this program cannot be normally recorded only after it is reproduced.

Figure 5:
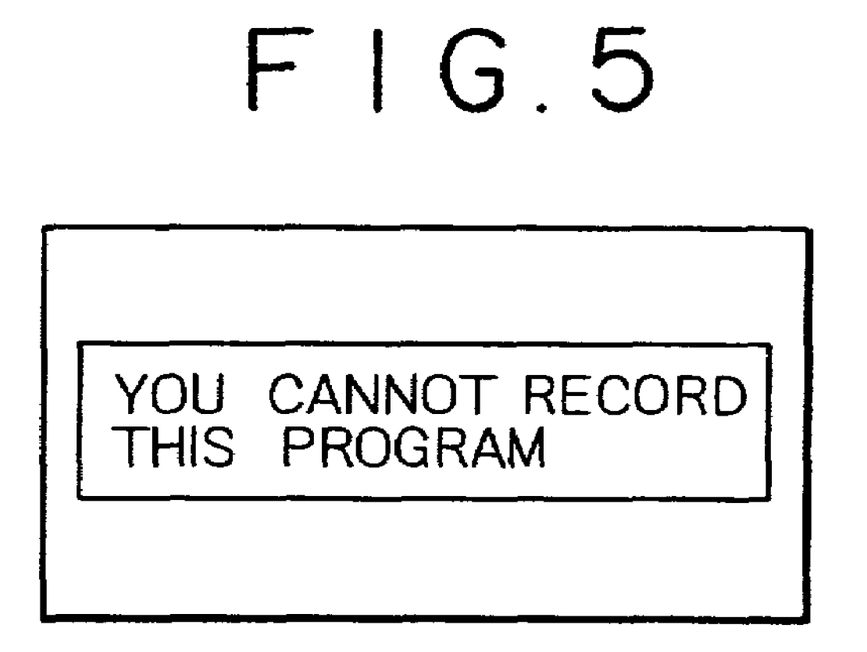
FIG. 5 is a diagram illustrating a message displayed on the satellite broadcast tuner shown in FIG. 2.

In order to overcome this inconvenience, the present embodiment is configured so that, when the record video now button 56 is pressed, the program is determined whether copy protected or not; if the program is found not copy protected, an infrared command signal is outputted from the AV mouse 4 to the video recording/reproducing device 3 to put the same into the video recording mode; if the program is found copy protected, a warning for copy protection is displayed on the display block in an on-screen manner as shown in FIG. 5, thereby disabling the outputting of the infrared command signal for setting the video recording/reproducing device 3 to the video recording mode. This warning display allows the user to instantly know that the program to be recorded is copy protected or not and, at the same time, the infrared command signal for setting the video recording/reproducing device 3 to the video recording mode is not outputted from the AV mouse 4, thereby preventing any video signals containing a copy protection signal from being recorded on the video recording/reproducing device 3.

Figure 6:
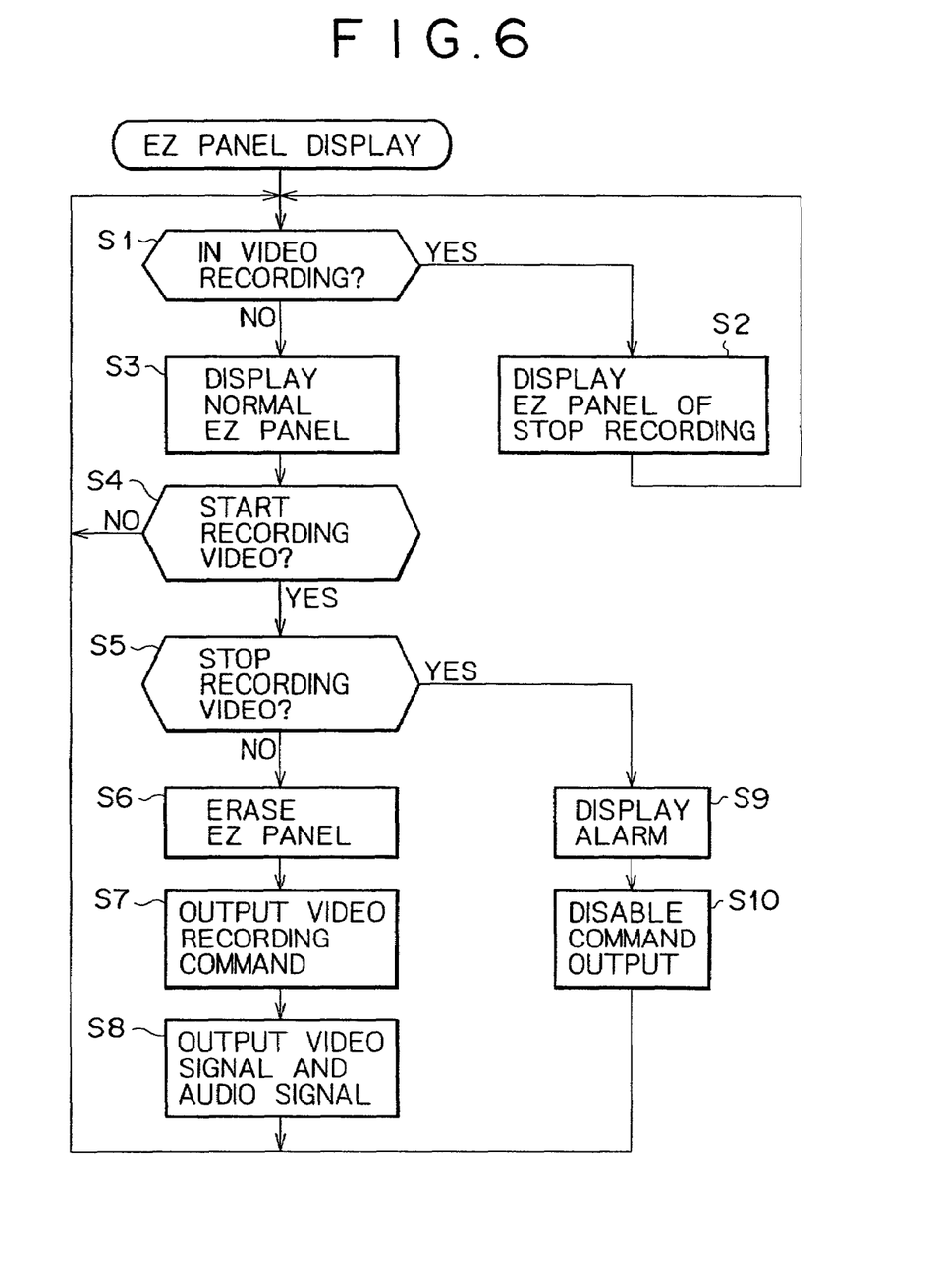
FIG. 6 is a flowchart for describing an operation of the satellite broadcast tuner shown in FIG. 2.

Referring to FIG. 6, there is shown a flowchart indicative of processing in which, when the record video now button is pressed, if the video signal is not copy protected, the video recording/reproducing device 3 is set to the video recording mode; if the video signal is copy protected, the warning indicative of copy protection is displayed in an on-screen manner, thereby disabling the setting of the video recording/reproducing device 3 to the video recording mode.

In step S1, the system determines whether the video recording/reproducing device 3 is recording some video signal or not. If the video recording/reproducing device 3 is found recording, the EZ panel including the stop video record button 56A (refer to FIG. 4) is displayed in an on-screen manner in step S2, upon which the system returns to step S1.

If the video recording/reproducing device 3 is found not recording, the normal EZ panel including the record video now button 56 (refer to FIG. 3) is displayed in an on-screen manner in step S3. Then, the system determines whether the record video now button 56 has been pressed to start recording or not in step S4.

If the recording has not started, the system returns to step S1. Therefore, when no recording is on, the normal EZ panel (refer to FIG. 3) is displayed in an on-screen manner. When recording is on, the EZ panel including the stop video record button 56A (refer to FIG. 4) is displayed in an on-screen manner.

If the recording is found started in step S4, the system determines whether the program is copy protected or not in step S5. Copy protection can be determined by the EMM/ECM of PSI in the received packet stream. If this program is found not copy protected, the normal EZ panel is erased in step S6. An infrared command signal for setting the video recording/reproducing device 3 to the recording state is outputted from the AV mouse 4 in step S7 and the video and audio signals of the program being received are outputted in step S8.

The infrared command signal outputted from the AV mouse 4 is received by the video recording/reproducing device 3, which is set by this command signal to the video recording state. Then, the video and audio signals of the program being received from the satellite broadcast tuner 1 are sent to the video recording/reproducing device 3 to be recorded on a recording medium such as a magnetic tape loaded in the video recording/reproducing device 3.

When the video and audio signals of the program being received are outputted for recording in step S8, the system returns to step S1. When the recording starts, the system determines that the recording is on in step S1. Then, the system proceeds to step S2, in which the EZ panel including the stop video record button 56A (refer to FIG. 4) is displayed in an on-screen manner.

If the program being received is found copy protected in step S5, the warning indicative of copy protection (refer to FIG. 5) is displayed in an on-screen manner in step S9. Then, the outputting of the infrared command signal from the AV mouse 4 is disabled in step S10, upon which the system returns to step S1.

Thus, in the above-mentioned example, it is determined in step S5 whether the program being received is copy protected or not. If the program is found copy protected, the warning screen is displayed in step S9 and the control over the external device is disabled in step S10. The warning display allows the user to know whether the program being received is copy protected or not and prevent the video signal containing a copy protection signal from being recorded on the video recording/reproducing device 3.

In the above-mentioned example, the video and audio signals of a program are recorded on the video recording/reproducing device by use of the record video now button 56. It will be apparent to those skilled in the art that the generally the same processing is executed when the recording is executed by use of the record audio now button 57.

In the above-mentioned example, the video recording/reproducing device 3 is controlled by infrared command signals outputted from the AV mouse 4. It will be apparent to those skilled in the art that the video recording/reproducing device 3 may be controlled by use of the IEEE 1394 interface for example.

While the preferred embodiments of the present invention have been described using specific terms, such description is for illustrative purposes only, and it is to be understood that changes and variations may be made without departing from the spirit or scope of the appended claims.

What is claimed is:

1. A receiving system composed of a receiving device, a monitor device for displaying an output of said receiving device, and an external recording device to be controlled by said receiving device, said receiving device comprising:
   on-screen display control means for displaying a screen corresponding to various setting states and arranging items on said screen;
   external device control means for setting an operation of said external recording device;
   control means for, when a recording input is given,
      determining whether or not a program being received is copy protected on the basis of Entitlement Control Message (ECM) data and Entitlement Management Message (EMM) data,
      setting said external recording device to a recording state if said program is initially found not copy protected,
      disabling control of said external recording device if said program is found copy protected before recording said received program onto said external recording device, and
      wherein said control means performs a stop input control function corresponding to a selected state upon the instance the recording input is given;
   whereby said external recording device is prevented from recording received copy protected programs, and
   determining means for determining if said program is recordable based on said Entitlement Control Message (ECM) data and said Entitlement Management Message (EMM) data,
      wherein said Entitlement Control Message (ECM) data and said Entitlement Management Message (EMM) data and descramble key data are simultaneously supplied to a descrambler.

2. The receiving system according to claim 1, wherein, if said program is found copy protected when said recording input is given, a warning indicative of copy protection is displayed on said screen.

3. The receiving system according to claim 1, wherein, when said recording input is given, an on-screen display is provided for stopping recording.

4. The receiving system according to claim 3, wherein, when said recording input is given, a button for stopping recording is put in a selected state on said screen.

5. The receiving system according to claim 1, wherein said external device control means controls said external recording device by using an AV mouse.

6. The receiving system according to claim 1, wherein said external device control means controls said external recording device by using an IEEE 1394 interface.

7. A receiving apparatus comprising:
   on-screen display control means for displaying a screen corresponding to various setting states and arranging items on said screen;
   external device control means for setting an operation of an external recording device; and
   control means for, when a recording input is given,
      determining whether or not a program being received is copy protected on the basis of Entitlement Control Message (ECM) data and Entitlement Management Message (EMM) data,
      setting said external recording device to a recording state if said program is initially found not copy protected,
      disabling control of said external recording device if said program is found copy protected before recording said received program onto said external recording device, wherein said control means performs a stop input control function corresponding to a selected state upon the instance the recording input is given;

whereby said external recording device is prevented from recording received copy protected programs; and determining means for determining if said program is recordable based on said Entitlement Control Message (ECM) data and said Entitlement Management Message (EMM) data, wherein said Entitlement Control Message (ECM) data and said Entitlement Management Message (EMM) data and descramble key data are simultaneously supplied to a descrambler.

8. The receiving apparatus according to claim 7, wherein, if said program is found copy protected when said recording input is given, a warning indicative of copy protection is displayed on said screen.

9. The receiving apparatus according to claim 7, wherein, when said recording input is given, an on-screen display is provided for stopping recording.

10. The receiving apparatus according to claim 9, wherein, when said recording input is given, a button for stopping recording is put in a selected state on said screen.

11. The receiving apparatus according to claim 7, wherein said external device control means controls said external recording device by using an AV mouse.

12. The receiving apparatus according to claim 7, wherein said external device control means controls said external recording device by using an IEEE 1394 interface.

13. A control method for controlling a receiving system composed of a receiving device, a monitor device for displaying an output of said receiving device, and an external recording device to be controlled by said receiving device, wherein said method comprises the steps of:

setting said external recording device to a recording state, when a recording input is given, whether or not a program being received is copy protected on the basis of Entitlement Control Message (ECM) data and Entitlement Management Message (EMM) data, if said program is found not copy protected, disabling control of said external recording device if said program is found copy protected before recording said received program onto said external recording device;

setting a selected state upon the instance the recording input is given which acts as a stop input for subsequent control;

whereby said external recording device is prevented from recording received copy protected programs;

determining if said program is recordable based on said Entitlement Control Message (ECM) data and said Entitlement Management Message (EMM) data; and simultaneously supplying said Entitlement Control Message (ECM) data and said Entitlement Management Message (EMM) data and descramble key data to a descrambler.

14. The control method for controlling a receiving system according to claim 13, wherein, if said program is found copy protected when said recording input is given, a warning indicative of copy protection is displayed on said monitor device.

15. The control method for controlling a receiving system according to claim 13, wherein, when said recording input is given, an on-screen display is provided for stopping recording.

16. The control method for controlling a receiving system according to claim 15, wherein, when said recording input is given, a button for stopping recording is put in a selected state on said on-screen display.

17. The control method for controlling a receiving system according to claim 13, wherein said external recording device is controlled by using an AV mouse.

18. The control method for controlling a receiving system according to claim 13, wherein said external recording device is controlled by using an IEEE 1394 interface.

* * * * *